United States Patent
Banerjee (10) Patent No.: US 10,513,096 B2
(45) Date of Patent: Dec. 24, 2019

(54) LAMINATE FOR VIGNETTE AND TONAL IMAGE PRINTING

(71) Applicant: Essel Propack Limited, Mumbai (IN)

(72) Inventor: Mrinal Kanti Banerjee, Mumbai (IN)

(73) Assignee: Essel Propack Limited, Mumbai (IN)

( * ) Notice: Subject to any disclaimer, the term of this patent is extended or adjusted under 35 U.S.C. 154(b) by 101 days.

(21) Appl. No.: 15/764,166

(22) PCT Filed: Jan. 6, 2017

(86) PCT No.: PCT/IN2017/050010
§ 371 (c)(1),
(2) Date: Mar. 28, 2018

(87) PCT Pub. No.: WO2017/119005
PCT Pub. Date: Jul. 13, 2017

(65) Prior Publication Data
US 2018/0281360 A1 Oct. 4, 2018

(30) Foreign Application Priority Data
Jan. 7, 2016 (IN) .............................. 201621000659

(51) Int. Cl.
*B32B 27/08* (2006.01)
*B32B 15/085* (2006.01)
(Continued)

(52) U.S. Cl.
CPC .............. *B32B 27/08* (2013.01); *B32B 1/08* (2013.01); *B32B 15/085* (2013.01); *B32B 15/20* (2013.01);
(Continued)

(58) Field of Classification Search
CPC ......... B32B 27/30; B32B 27/32; B32B 37/15; Y10T 428/2495; Y10T 428/2848
See application file for complete search history.

(56) References Cited

U.S. PATENT DOCUMENTS

2010/0266828 A1* 10/2010 Banerjee ................. B32B 27/08
428/220
2012/0156478 A1 6/2012 Menalda et al.
(Continued)

FOREIGN PATENT DOCUMENTS

| CN | 101100123 A | 1/2008 |
|---|---|---|
| JP | 2001301777 A | 10/2001 |
| WO | WO 2011/004001 A1 | 1/2011 |

*Primary Examiner* — Betelhem Shewareged
(74) *Attorney, Agent, or Firm* — Brinks Gilson & Lione (57) ABSTRACT

In accordance with the present subject matter there is provided a laminate for vignette and tonal image printing comprising: a top printable layer of polyethylene polymer selected from the group consisting of metallocene linear low density polyethylene (mLLDPE), linear low density polyethylene (LLDPE) with high melt flow index (MFI), low density polyethylene (LDPE), and combinations thereof; a middle layer comprising of at least one surface film layer of a blend of linear low density polyethylene (LLDPE), and high density polyethylene (HDPE); a inner polyethylene (PE) layer; wherein said printable layer exhibits a gel count in the range of 1-10 per sqm. There is also provided a process for manufacturing the laminate for vignette and tonal image printing.

19 Claims, 2 Drawing Sheets

(51) Int. Cl.
    *B32B 15/20*     (2006.01)
    *B32B 27/20*     (2006.01)
    *B32B 27/30*     (2006.01)
    *B32B 27/32*     (2006.01)
    *B32B 1/08*     (2006.01)
    *B32B 37/08*     (2006.01)
    *B32B 37/10*     (2006.01)

(52) U.S. Cl.
    CPC ............ *B32B 27/20* (2013.01); *B32B 27/306* (2013.01); *B32B 27/308* (2013.01); *B32B 27/327* (2013.01); *B32B 37/08* (2013.01); *B32B 37/10* (2013.01); *B32B 2264/102* (2013.01); *B32B 2264/104* (2013.01); *B32B 2270/00* (2013.01); *B32B 2307/4023* (2013.01); *B32B 2307/72* (2013.01); *B32B 2307/7244* (2013.01); *B32B 2307/75* (2013.01); *B32B 2323/043* (2013.01); *B32B 2323/046* (2013.01); *B32B 2439/00* (2013.01); *B32B 2597/00* (2013.01); *Y10T 428/2495* (2015.01); *Y10T 428/2848* (2015.01)

(56) References Cited

U.S. PATENT DOCUMENTS

| | | | |
|---|---|---|---|
| 2014/0134370 A1* | 5/2014 | Abhyankar | ............ B32B 27/08 428/36.6 |
| 2015/0158278 A1* | 6/2015 | Banerjee | ................ B32B 27/34 428/35.2 |
| 2018/0281360 A1* | 10/2018 | Banerjee | ............... B32B 15/085 |

* cited by examiner

LAMINATE FOR VIGNETTE AND TONAL IMAGE PRINTING

RELATED APPLICATIONS

This application is the 371 U.S. national phase of PCT International Patent Application Ser. No. PCT/IN2017/050010, filed Jan. 6, 2017, designating the United States and published in English, which claims priority from Indian Patent Application No. 201621000659, filed on Jan. 7, 2016. All of the foregoing applications are hereby incorporated by reference.

TECHNICAL FIELD

The subject matter described herein in general relates to a laminate for vignette and tonal image printing, a tube container made from the laminate, and process of making the laminate tube container.

BACKGROUND

The use of laminates for packaging is well known in the industry. The laminates used for packaging desirably have physical properties such as, for example, strength, stiffness, abrasion and chemical resistance, and capability of good quality printing.

Surface Printing of general purpose image such as bold and solid text panel or cartoon characters on the filmic surface have certain challenges to overcome. Polymer intrinsic gels, indentation marks and surface roughness does not allow the inks, specifically the UV curing viscous inks, to cover the image surface with uniform and homogenous dot gain. Missing dots are seen as voids and flaws in the print reproduction and goes in to rejection bin.

Thus there is a need for providing a laminate surface having a good quality printing properties.

SUMMARY

The present disclosure relates to a laminate layer surface for vignette and tonal image printing comprising: a top printable layer of polyethylene polymer selected from the group consisting of metallocene linear low density polyethylene (mLLDPE), linear low density polyethylene (LLDPE) with high melt flow index (MFI), low density polyethylene (LDPE), and combinations thereof; a middle layer comprising of at least one surface film layer of a blend of linear low density polyethylene (LLDPE), and high density polyethylene (HDPE); a inner polyethylene (PE) layer; wherein said printable layer surface exhibits a gel count in the range of 1-10 per sqm.

The present disclosure relates to a laminate for vignette and tonal image printing comprising: a top printable single layer of a blend of metallocene linear low density polyethylene (mLLDPE), and low density polyethylene (LDPE) with a blend ratio in the range of 2:1 to 1:1, wherein the printable layer has a thickness of 20 microns; a middle layer comprising of a surface film layer, wherein the surface film is a three layer combination of a blend of linear low density polyethylene (LLDPE), and high density polyethylene (HDPE) with a blend ratio in the range of 1:1 to 1:9, wherein the surface film layer has a thickness of 70 microns; a first co-extruded polymer layer comprising of a primary layer of only linear low density polyethylene (LLDPE) with thickness in the range of 15 microns in contact with the surface film layer, and a secondary layer of EAA with thickness of 15 microns in contact with a barrier layer of aluminum foil with thickness of 12 microns; a second co-extruded polymer layer comprising of a secondary layer of EAA with thickness of 15 microns in contact with the barrier layer, and a primary layer of only linear low density polyethylene (LLDPE) with thickness of 15 microns in contact with inner polyethylene (PE) layer; an inner polyethylene (PE) layer, wherein the inner polyethylene (PE) layer is a three layer combination of linear low density polyethylene (LLDPE), and high density polyethylene (HDPE), wherein the inner polyethylene (PE) layer has a thickness of 40 microns, wherein said printable layer exhibits a gel count in the range of 1-10 per sqm.

The present disclosure relates to a laminate for vignette and tonal image printing comprising: a top printable single layer of a blend of metallocene linear low density polyethylene (mLLDPE), and low density polyethylene (LDPE) with a blend ratio in the range of 2:1 to 1:1, wherein the printable layer has a thickness of 20 microns; a middle layer comprising of a surface film layer, wherein the surface film is a three layer combination of a blend of linear low density polyethylene (LLDPE), and high density polyethylene (HDPE) with a blend ratio in the range of 1:1 to 1:9, wherein the surface film layer has a thickness of 70 microns; a first co-extruded polymer layer comprising of a primary layer of only linear low density polyethylene (LLDPE) with thickness of 12 microns in contact with surface film layer, and a secondary layer of only linear low density polyethylene (LLDPE) with thickness of 12 microns in contact with a barrier layer of EVOH film with thickness of 79 microns; a second co-extruded polymer layer comprising of a secondary layer of only linear low density polyethylene (LLDPE) with thickness of 12 microns in contact with the barrier layer, and a primary layer of only linear low density polyethylene (LLDPE) with thickness of 12 microns in contact with inner polyethylene (PE) layer; an inner polyethylene (PE) layer, wherein the inner polyethylene (PE) layer is a three layer combination of linear low density polyethylene (LLDPE), and high density polyethylene (HDPE), wherein the inner polyethylene (PE) layer has a thickness of 40 microns, wherein said printable layer exhibits a gel count in the range of 1-10 per sqm.

The present disclosure relates to a process of manufacturing the laminate as described herein, said process comprising the steps of: a. obtaining an inner polyethylene (PE) layer; b. contacting the inner polyethylene (PE) layer with a first co-extruded polymer layer, a barrier layer, and a second co-extruded polymer layer to obtain a composite semi-laminate; c. contacting the composite semi-laminate with a surface film layer to obtain a semi-laminated substrate; d. contacting the semi-laminated substrate with a blend of metallocene linear low density polyethylene (mLLDPE), and low density polyethylene (LDPE) to obtain a surface coated laminate; and e. cooling and compressing the surface coated laminate to obtain the laminate for vignette and tonal image printing.

The present disclosure also relates to a tube container made of the laminate as described herein.

The present disclosure further relates to a process of manufacturing the tube container from the said laminate as described herein.

These and other features, aspects and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art.

The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 120° C. to about 150° C. should be interpreted to include not only the explicitly recited limits of about 120° C. to about 150° C., but also to include sub-ranges, such as 125° C. to 145° C., 130° C. to 150° C., and so forth, as well as individual amounts, including fractional amounts, within the specified ranges, such as 122.2° C., 140.6° C., and 141.3° C., for example.

As discussed above, Gel count affects the printing properties of the surface. Gels originate either from the intrinsic properties of the polymer itself or due to the heat exposure and cross polymerization during the extrusion process. General purpose unprinted or slightly printed packaging film could have gel count between 20 to 50 nos./m$^2$ and gel size of 10-30 micron. However, for tonal printing and high precision commercial printing, gel count must be below 10 nos./m$_2$ and gel size of 2-10 micron. The present disclosure relates to a laminate which allows for vignette and tonal image printing. The top layer of the laminate has a low gel count which provides a flawless print surface.

In one implementation, the present disclosure relates to a laminate for vignette and tonal image printing comprising: a top printable layer of polyethylene polymer selected from the group consisting of metallocene linear low density polyethylene (mLLDPE), linear low density polyethylene (LLDPE) with high melt flow index (MFI), low density polyethylene (LDPE), and combinations thereof; a middle layer comprising of at least one surface film layer of a blend of linear low density polyethylene (LLDPE), and high density polyethylene (HDPE); an inner polyethylene (PE) layer; wherein said printable layer exhibits a gel count in the range of 1-10 per sqm.

In one implementation, the present disclosure relates to a laminate for vignette and tonal image printing comprising a top printable layer of polyethylene polymer selected from the group consisting of metallocene linear low density polyethylene (mLLDPE), linear low density polyethylene (LLDPE) with high melt flow index (MFI), low density polyethylene (LDPE), and combinations thereof.

In one implementation, the printable layer of polyethylene polymer is a blend of mLLDPE, and LDPE. In one implementation, the blend of mLLDPE to LDPE has a blend ratio in the range of 3:1 to 1:1. In another implementation, the blend of mLLDPE to LDPE has a blend ratio in the range of 2:1 to 1:1.

In one implementation, the printable layer of polyethylene polymer is a blend of LLDPE with high MFI, and LDPE. In one implementation, the blend ratio of LLDPE with high MFI to LDPE is in the range of 3:1 to 1:1. In another implementation, the blend ratio of LLDPE with high MFI to LDPE is in the range of 2:1 to 1:1. In one implementation, the MFI is in the range of 6.0 to 20.0

In one implementation, the printable layer of polyethylene polymer has a density in the range of 0.91 to 0.925 g/cc. In one implementation, the printable layer of polyethylene polymer has a thickness in the range of 15 to 30 microns. In one implementation, the printable layer of polyethylene polymer has a thickness of 20 microns.

In one implementation, the printable layer of polyethylene polymer exhibits a gel count in the range of 1-10 per sqm. In another implementation, the printable layer of polyethylene polymer exhibits a gel count of 9 per sqm.

In one implementation, the present disclosure relates to a laminate for vignette and tonal image printing comprising a middle layer comprising of at least one surface film layer of a blend of LLDPE, and HDPE. In one implementation, the blend of LLDPE and HDPE has a blend ratio in the range of 1:1 to 1:9.

In one implementation, the surface film layer is at least a three layer combination of a blend of LLDPE, and HDPE. In another implementation, the surface film layer is a three layer combination of a blend of LLDPE, and HDPE.

In one implementation, the surface film layer has a thickness in the range of 50 to 150 microns. In another implementation, the surface film layer has a thickness of 70 microns. In one implementation, the surface film layer has a density in the range of 0.945 to 0.965 g/cc.

In one implementation, the surface film layer further comprises a colorant. In one implementation, the colorant is selected from the group consisting of titanium dioxide ($TiO_2$), zinc disulfide ($ZnS_2$), zinc oxide (ZnO), barium sulfate ($BaSO_4$) and Calcium Carbonate ($CaCO_3$).

In one implementation, the surface film layer comprises of at least one layer of a blend of LLDPE, HDPE, and a colorant. In one implementation, the blend of LLDPE, HDPE, and a colorant has a blend ratio in the range of 45:50:5 to 20:70:10.

In one implementation, the present disclosure relates to a laminate for vignette and tonal image printing comprising a middle layer comprising of at least one surface film layer of a blend of LLDPE, and HDPE, wherein the middle layer comprises of a barrier layer placed in between first and second co-extruded polymer layers, wherein the first co-extruded polymer layer is in contact with the surface film layer and the second co-extruded polymer layer is in contact with the inner PE layer.

In one implementation, the barrier layer is selected from the group consisting of aluminum foil, ethyl vinyl alcohol (EVOH) film, and combinations thereof. In one implementation, the barrier layer is aluminum foil. In one implementation, the barrier layer of aluminum foil has thickness in the range of 9 to 40 microns. In another implementation, the barrier layer of aluminum foil has thickness of 12 microns. In another implementation, the barrier layer is EVOH film. The EVOH film is a multilayer film having at least five layers. In one implementation, the EVOH film has five layers. In one implementation, the EVOH film has six layers. In one implementation, the EVOH film has seven layers. In one implementation, the barrier layer of EVOH film has thickness in the range of 54 to 88 microns. In another implementation, the barrier layer of EVOH film has thickness of 79 microns.

In one implementation, the barrier layer is placed in between first and second co-extruded polymer layers. The first co-extruded polymer layer is in contact with the surface film layer and the barrier layer and the second co-extruded polymer layer is in contact with the barrier layer and the inner PE layer.

In one implementation, the first co-extruded layer comprises of a primary layer in contact with the surface film layer and a secondary layer in contact with the barrier layer. The primary layer is a layer of only LLDPE. The secondary layer is a layer selected from the group consisting of an ethylene acrylic acid (EAA) layer and a layer of only LLDPE. In one implementation, the primary layer is a layer of only LLDPE and the secondary layer is an EAA layer. In another implementation, the primary layer is a layer of only LLDPE and the secondary layer is a layer of only LLDPE.

In one implementation, the primary layer with thickness in the range of 10 to 25 microns is in contact with the surface film layer. In another implementation, the primary layer with thickness of 15 microns is in contact with the surface film layer. In one implementation, the secondary layer with thickness in the range of 10 to 25 microns is in contact with the barrier layer. In one implementation, the secondary layer with thickness of 15 microns is in contact with the barrier layer. In yet another implementation, the secondary layer with thickness of 12 microns is in contact with the barrier layer.

In one implementation, the second co-extruded layer comprises of a primary layer in contact with the inner PE layer and a secondary layer in contact with the barrier layer. The primary layer is a layer of only LLDPE. The secondary layer is a layer selected from the group consisting of an EAA layer and a layer of only LLDPE. In one implementation, the primary layer is a layer of only LLDPE and the secondary layer is an EAA layer. In another implementation, the primary layer is a layer of only LLDPE and the secondary layer is a layer of only LLDPE.

In one implementation, the primary layer with thickness in the range of 10 to 25 microns is in contact with the inner PE layer. In another implementation, the primary layer with thickness of 15 microns is in contact with the inner PE layer. In one implementation, the secondary layer with thickness in the range of 10 to 25 microns is in contact with the barrier layer. In one implementation, the secondary layer with thickness of 15 microns is in contact with the barrier layer. In yet another implementation, the secondary layer with thickness of 12 microns is in contact with the barrier layer.

In one implementation, the barrier layer is aluminum foil. The barrier layer made of aluminum foil has thickness of 12 microns. The barrier layer is placed in between a first co-extruded polymer layer comprising of a primary layer of only LLDPE with a thickness of 15 microns and a secondary layer of EAA with a thickness of 15 microns, and a second co-extruded polymer layer comprising of a primary layer of only LLDPE with a thickness of 15 microns and a secondary layer of EAA with a thickness of 15 microns.

In one implementation, the barrier layer is an EVOH film having five layers. The five layer of the film comprises of a layer of PE with TIE on either side of the EVOH layer. TIE polymer is a maleic anhydride grafted PE co-polymer. The barrier layer made of EVOH film has thickness of 79 microns. The barrier layer is placed in between a first co-extruded polymer layer comprising of a primary layer of only LLDPE with a thickness of 12 microns and a secondary layer of only LLDPE with a thickness of 12 microns, and a second co-extruded polymer layer comprising of a primary layer of only LLDPE with a thickness of 12 microns and a secondary layer of only LLDPE with a thickness of 12 microns.

In one implementation, the present disclosure relates to a laminate for vignette and tonal image printing comprising an inner PE layer. In one implementation, the inner PE layer is the product contact layer.

In one implementation, the inner PE layer comprises of at least one layer of a blend of LLDPE, and HDPE. In one implementation, the inner PE layer is a three layer combination of
LLDPE, and HDPE. The blend of LLDPE and HDPE has a blend ratio in the range of 1:1 to 1:9.

In one implementation, the inner PE layer has a thickness in the range of 40 to 100 microns. In another implementation, the inner PE layer has a thickness of 40 microns. In one implementation, the inner PE layer has a density in the range of 0.945 to 0.965 g/cc.

In one implementation, the present disclosure relates to a laminate for vignette and tonal image printing comprising: a top printable single layer of a blend of metallocene linear low density polyethylene (mLLDPE), and low density polyethylene (LDPE) with a blend ratio in the range of 2:1 to 1:1, wherein the printable layer has a thickness of 20 microns; a middle layer comprising of a surface film layer, wherein the surface film is a three layer combination of a blend of linear low density polyethylene (LLDPE), and high density polyethylene (HDPE) with a blend ratio in the range of 1:1 to 1:9, wherein the surface film layer has a thickness of 70 microns; a first co-extruded polymer layer comprising of a primary layer of only linear low density polyethylene (LLDPE) with thickness in the range of 15 microns in contact with the surface film layer, and a secondary layer of EAA with thickness of 15 microns in contact with a barrier layer of aluminum foil with thickness of 12 microns; a second co-extruded polymer layer comprising of a secondary layer of EAA with thickness of 15 microns in contact with the barrier layer, and a primary layer of only linear low density polyethylene (LLDPE) with thickness of 15 microns in contact with inner polyethylene (PE) layer; an inner polyethylene (PE) layer, wherein the inner polyethylene (PE) layer is a three layer combination of linear low density polyethylene (LLDPE), and high density polyethylene (HDPE), wherein the inner polyethylene (PE) layer has a thickness of 40 microns, wherein said printable layer exhibits a gel count in the range of 1-5 per sqm.

Figure 2:
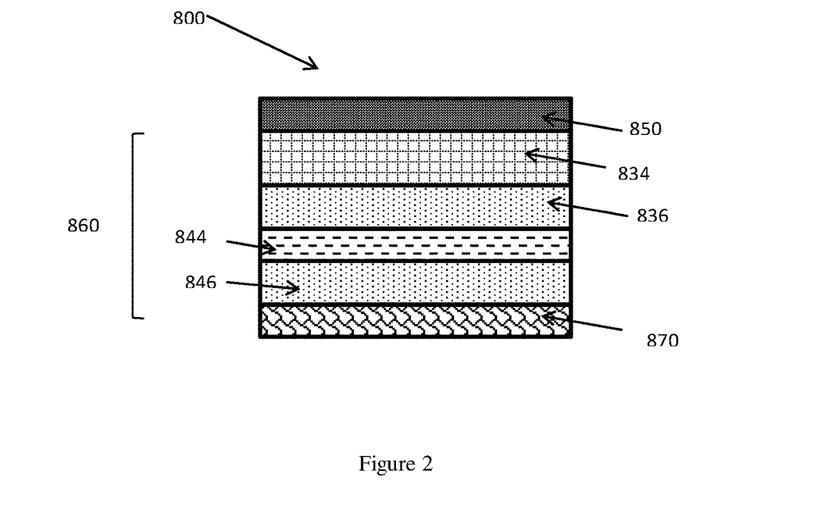
FIG. 2 illustrates a laminate for vignette and tonal image printing comprising aluminum foil as the barrier layer, according to an implementation of the present disclosure.

In one implementation of the present disclosure, FIG. 2 illustrates an exemplary structure of a laminate for vignette and tonal image printing 800. In one implementation, the present disclosure relates to a laminate for vignette and tonal image printing 800 comprising: a top printable single layer 850 of a blend of metallocene linear low density polyethylene (mLLDPE), and low density polyethylene (LDPE) with a blend ratio in the range of 2:1 to 1:1, wherein the printable layer 850 has a thickness of 20 microns; a middle layer 860 comprising of a surface film layer 834, wherein the surface film is a three layer combination of a blend of linear low density polyethylene (LLDPE), and high density polyethylene (HDPE) with a blend ratio in the range of 1:1 to 1:9, wherein the surface film layer 834 has a thickness of 70 microns;

a first co-extruded polymer layer 836 comprising of a primary layer of only linear low density polyethylene (LLDPE) with thickness in the range of 15 microns in contact with the surface film layer 834, and a secondary layer of EAA with thickness of 15 microns in contact with a barrier layer of aluminum foil 844 with thickness of 12 microns; a second co-extruded polymer layer 846 comprising of a secondary layer of EAA with thickness of 15 microns in contact with the barrier layer 844, and a primary layer of only linear low density polyethylene (LLDPE) with thickness of 15 microns in contact with inner polyethylene (PE) layer 870; an inner polyethylene (PE) layer 870, wherein the inner polyethylene (PE) layer is a three layer combination of linear low density polyethylene (LLDPE), and high density polyethylene (HDPE), wherein the inner polyethylene (PE) layer 870 has a thickness of 40 microns, wherein said printable layer 850 exhibits a gel count in the range of 1-10 per sqm.

In one implementation, the present disclosure relates to a laminate for vignette and tonal image printing comprising: a top printable single layer of a blend of metallocene linear low density polyethylene (mLLDPE), and low density polyethylene (LDPE) with a blend ratio in the range of 2:1 to 1:1, wherein the printable layer has a thickness of 20 microns; a middle layer comprising of a surface film layer, wherein the surface film is a three layer combination of a blend of linear low density polyethylene (LLDPE), and high density polyethylene (HDPE) with a blend ratio in the range of 1:1 to 1:9, wherein the surface film layer has a thickness of 70 microns; a first co-extruded polymer layer comprising of a primary layer of only linear low density polyethylene (LLDPE) with thickness of 12 microns in contact with surface film layer, and a secondary layer of only linear low density polyethylene (LLDPE) with thickness of 12 microns in contact with a barrier layer of EVOH film with thickness of 79 microns; a second co-extruded polymer layer comprising of a secondary layer of only linear low density polyethylene (LLDPE) with thickness of 12 microns in contact with the barrier layer, and a primary layer of only linear low density polyethylene (LLDPE) with thickness of 12 microns in contact with inner polyethylene (PE) layer; an inner polyethylene (PE) layer, wherein the inner polyethylene (PE) layer is a three layer combination of linear low density polyethylene (LLDPE), and high density polyethylene (HDPE), wherein the inner polyethylene (PE) layer has a thickness of 40 microns, wherein said printable layer exhibits a gel count in the range of 1-10 per sqm.

Figure 3:
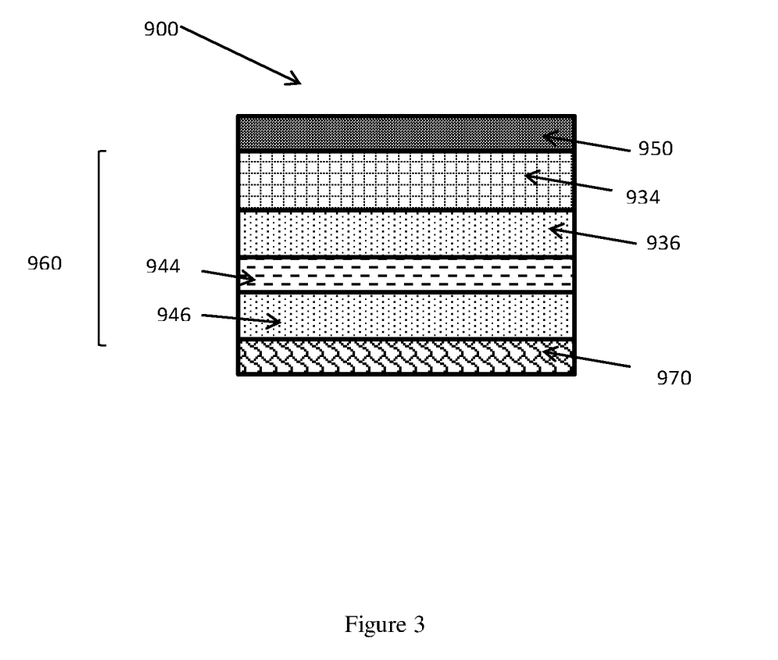
FIG. 3 illustrates a laminate for vignette and tonal image printing comprising EVOH film as the barrier layer, according to an implementation of the present disclosure.

In one implementation of the present disclosure, FIG. 3 illustrates an exemplary structure of a laminate for vignette and tonal image printing 900. In one implementation, the present disclosure relates to a laminate for vignette and tonal image printing 900 comprising: a top printable single layer 950 of a blend of metallocene linear low density polyethylene (mLLDPE), and low density polyethylene (LDPE) with a blend ratio in the range of 2:1 to 1:1, wherein the printable layer 950 has a thickness of 20 microns; a middle layer 960 comprising of a surface film layer 934, wherein the surface film is a three layer combination of a blend of linear low density polyethylene (LLDPE), and high density polyethylene (HDPE) with a blend ratio in the range of 1:1 to 1:9, wherein the surface film layer 934 has a thickness of 70 microns; a first co-extruded polymer layer 936 comprising of a primary layer of only linear low density polyethylene (LLDPE) with thickness of 12 microns in contact with surface film layer 934, and a secondary layer of only linear low density polyethylene (LLDPE) with thickness of 12 microns in contact with a barrier layer of EVOH film 944 with thickness of 79 microns; a second co-extruded polymer layer 946 comprising of a secondary layer of only linear low density polyethylene (LLDPE) with thickness of 12 microns in contact with the barrier layer 944, and a primary layer of only linear low density polyethylene (LLDPE) with thickness of 12 microns in contact with inner polyethylene (PE) layer 970; an inner polyethylene (PE) layer 970, wherein the inner polyethylene (PE) layer is a three layer combination of linear low density polyethylene (LLDPE), and high density polyethylene (HDPE), wherein the inner polyethylene (PE) layer 970 has a thickness of 40 microns, wherein said printable layer 950 exhibits a gel count in the range of 1-10 per sqm.

In one implementation, the present disclosure relates to a laminate for vignette and tonal image printing wherein the laminate thickness is in the range of 154 to 470 microns. In another implementation, the laminate thickness is 202 microns. In another implementation, the laminate thickness is 257 microns.

In one implementation, the present disclosure relates to a process for preparation of a laminate for vignette and tonal image printing said process comprising the steps of: a. obtaining an inner polyethylene (PE) layer; b. contacting the inner polyethylene (PE) layer with a first co-extruded polymer layer, a barrier layer, and a second co-extruded polymer layer to obtain a composite semi-laminate; c. contacting the composite semi-laminate with a surface film layer to obtain a semi-laminated substrate; d. contacting the semi-laminated substrate with a blend of metallocene linear low density polyethylene (mLLDPE), and low density polyethylene (LDPE) to obtain a surface coated laminate; and e. cooling and compressing the surface coated laminate to obtain the laminate for vignette and tonal image printing.

In one implementation, the present disclosure relates to a tube container made of the laminate for vignette and tonal image printing. The tube container is designed to hold semi liquid products.

In one implementation, the present disclosure relates to a process of manufacturing the tube container from the said laminate. The process comprises the steps of forming a tube body (sleeve) with the help of tube body maker which consists of tube forming mandrel, inner and outer magnetic band, high frequency generator for tube side seaming, cooling mandrel, sleeve cutting and transferring device to carry the sized sleeve to tube header. Sized sleeve is transferred to the tube heading mandrel individually. It is then compression moulded with molten HDPE to form tube shoulder and threaded neck portion, following which it is cooled down to room temperature, autocapped and unloaded to the auto packing device. The autopacker packs the ready to use printed and capped tubes which are then palletized for onward shipment to the specific customer.

EXAMPLES

The disclosure will now be illustrated with working examples, which is intended to illustrate the working of disclosure and not intended to take restrictively to imply any limitations on the scope of the present disclosure. Other examples are also possible which are within the scope of the present disclosure.

Example 1

Process for Preparing a Laminate

Figure 1:
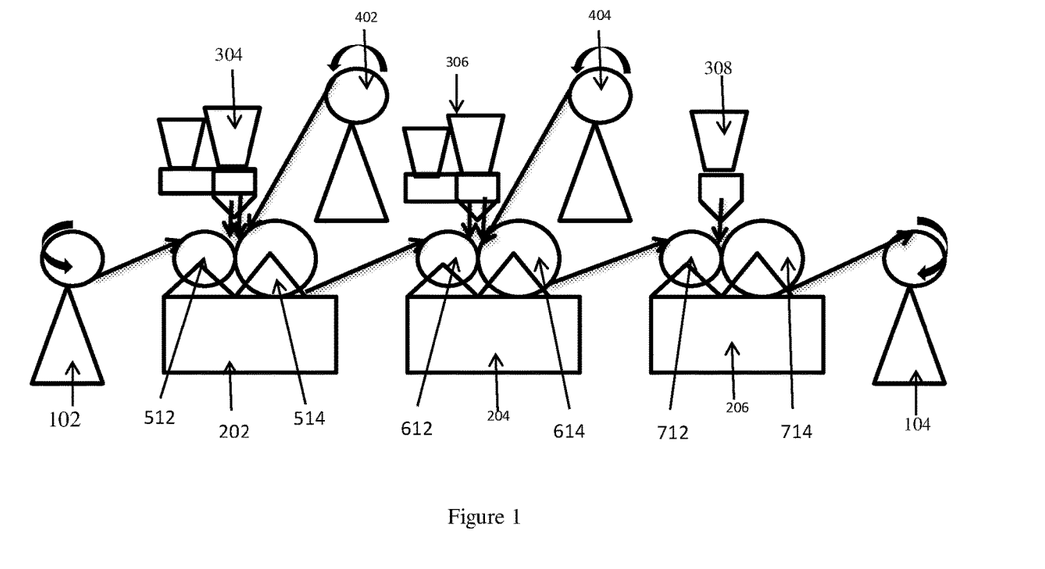
FIG. 1 illustrates a process flow for the preparation of a laminate for vignette and tonal image printing, according to an implementation of the present disclosure.

The process for preparing a laminate in accordance to the present disclosure is depicted in FIG. 1.

Process for Preparing the Laminate 1 with Aluminum Foil as the Barrier Layer

The process included obtaining a three layer natural PE film made of HDPE and LLDPE in a blend ratio of 2:1. The three layer natural PE film having a thickness of 40 micron was mounted on the main unwinder 102. Natural PE film i.e. primary substrate was taken forward and threaded through a first laminating head 202, where first co-extruded polymer melt was extruded onto the primary substrate. The first co-extruded polymer melt consists of one thermoplastic polymer (LLDPE) with higher melt flow index in excess of 7.0 and another melt of co-polymer of polyethylene (EAA) with melt flow index excess of 6.0. Layer thickness of LLDPE and EAA was 15 micron each and layer ratio 1:1. From the first Secondary Unwinder 402, a layer of aluminum foil, 12 micron was added to the Laminating head 202 which got bonded together with the help of co-extruded hot polymer melt from first co-extruder head 304, to form a composite semi laminate. Composite semi laminate (82 micron) then flows forward to a second laminating head 204 where another coextruded hot polymer melt containing 15 micron EAA and 15 micron LLDPE were added from second co-extruder head 306. Simultaneously, additional 70 micron three layer White PE film containing LLDPE and HDPE in a blend ratio of 2:1 from sandwich unwinder 404 was added to the laminating head 204. White PE film comprises of 6% (w/w) of TiO2. As soon as the semi laminated substrate, coextruded hot polymer melted and 70 micron White PE film passed through the laminating head NIP roll 612, a composite semi laminate of 182 micron was formed. Composite multilayer semi laminate (182 micron) was passed through the coating Head 206 where 20 micron polymer hot melt comprising of mLLDPE and LDPE in a blend ratio of 2:1 and having a MFI of 6 to 20 was extruded on the semi composite laminate print surface from extruder 308. Once the semi composite laminate and extruded hot polymer melt passed through coating head NIP roll 712 and Mirror finish Chill roll 714, hot polymer melt, along with semi composite laminate solidified and replicated the mirror finish surface similar to the Chill roll 714. Mirror finished multilayer laminate (202 micron) was then moved to the rewinder 104 for coiling and roll buildup.

Table 1 shows the different layers present in the laminate 1 for vignette and tonal image printing. The composition is shown from outside to inside.

TABLE 1

Material composition of laminate 1.

| IND. LAYER | MATERIAL TYPE | | LAYER THICKNESS IN MIC | TOLERANCE ± % |
|---|---|---|---|---|
| TOP COATING | mLLDPE + LDPE (BLEND) | SINGLE COATING LAYER | 20 | 10 |
| WHITE PE FILM | HDPE + LLDPE | (3 LAYER COMBINATION FILM | 70 | 10 |
| CO-EXTRUDED POLYMER | LLDPE, 100% | SINGLE LAYER | 15 | 10 |
| | EAA, 100% | SINGLE LAYER | 15 | 10 |
| AL-FOIL | ENAW-1200 | SINGLE LAYER | 12 | 10 |
| CO-EXTRUDED POLYMER | EAA, 100% | SINGLE LAYER | 15 | 10 |
| | LLDPE, 100% | SINGLE LAYER | 15 | 10 |
| NATURAL PE FILM | LLDPE + HDPE | (3 LAYER COMBINATION FILM) | 40 | 10 |

Process for Preparing the Laminate 2 with EVOH Film as the Barrier Layer

The process included obtaining a three layer natural PE film made of HDPE and LLDPE in a blend ratio of 2:1. The three layer natural PE film having a thickness of 40 micron was mounted on the main unwinder 102. Natural PE film i.e. primary substrate was taken forward and threaded through a first laminating head 202, where first co-extruded polymer melt was extruded onto the primary substrate. The first co-extruded polymer melt consists of two layers of thermoplastic polymer (LLDPE). Layer thickness of each LLDPE layer was 12 micron each. From the first Secondary Unwinder 402, five layers of EVOH film, 79 micron (20 micron LLDPE, 12 micron TIE, 15 micron EVOH, 12 micron TIE, and 20 micron LLDPE) was added to the Laminating head 202 which got bonded together with the help of co-extruded hot polymer melt from first co-extruder head 304, to form a composite semi laminate. Composite semi laminate (143 micron) then flows forward to a second laminating head 204 where another coextruded hot polymer melt containing two layers each of 12 micron LLDPE were added from second coextruder head 306. Simultaneously, additional 70 micron three layer white PE multilayer film containing LLDPE and HDPE in a blend ratio of 1:2 from sandwich unwinder 404 was added to the laminating head 204. White PE film comprises of 6% (w/w) of TiO2. As soon as the semi laminated substrate, coextruded hot polymer melted and 70 micron white PE film passed through the laminating head NIP roll 612, a composite semi laminate of 237 micron was formed. The composite semi laminate (237 micron) was passed through the coating Head 206 where 20 micron polymer hot melt comprising of mLLDPE and LDPE in a blend ratio of 2:1 and having a MFI of 6 to 20 was extruded on the semi composite laminate print surface from extruder 308. Once the semi composite laminate and extruded hot polymer melt passed through coating head NIP roll 712 and Mirror finish Chill roll 714, hot polymer melt, along with semi composite laminate solidified and replicated the mirror finish surface similar to the Chill roll 714. Mirror finished multilayer laminate (257 micron) was then moved to the rewinder 104 for coiling and roll buildup.

Table 2 shows the different layers present in the laminate 2 for vignette and tonal image printing. The composition is shown from outside to inside.

TABLE 2

Material composition for laminate 2.

| IND. LAYER | MATERIAL TYPE | | LAYER THICKNESS IN MIC | TOLERANCE ± % |
|---|---|---|---|---|
| TOP COATING | mLLDPE + LDPE (BLEND) | SINGLE COATING LAYER | 20 | 10 |
| WHITE PE FILM | HDPE + LLDPE | (3 LAYER COMBINATION FILM | 70 | 10 |
| CO-EXTRUDED POLYMER | LLDPE, 100% | SINGLE LAYER | 12 | 10 |
| | LLDPE, 100% | SINGLE LAYER | 12 | 10 |
| EVOH multilayer film (5 to 7 layer) | PE//TIE//EVOH//TIE// PE | SINGLE LAYER | 79 | 10 |
| CO-EXTRUDED POLYMER | LLDPE, 100% | SINGLE LAYER | 12 | 10 |
| | LLDPE, 100% | SINGLE LAYER | 12 | 10 |
| NATURAL PE FILM | LLDPE + HDPE | (3 LAYER COMBINATION FILM) | 40 | 10 |

Process for Preparing a Regular Laminate without Top PE Coating

The process included obtaining a three layer natural PE film made of HDPE and LLDPE in a blend ratio of 2:1. The three layer natural PE film having a thickness of 40 micron was mounted on the main unwinder 102. Natural PE film i.e. primary substrate was taken forward and threaded through a first laminating head 202, where first co-extruded polymer melt was extruded onto the primary substrate. The first co-extruded polymer melt consists of one thermoplastic polymer (LLDPE) with higher melt flow index in excess of 7.0 and another melt of co-polymer of polyethylene(EAA) with melt flow index excess of 6.0. Layer thickness of LLDPE and EAA was 15 micron each and layer ratio 1:1. From the first Secondary Unwinder 402, a layer of aluminum foil, 12 micron was added to the Laminating head 202 which got bonded together with the help of co-extruded hot polymer melt from first co-extruder head 304, to form a composite semi laminate. Composite semi laminate (82 micron) then flows forward to a second laminating head 204 where another coextruded hot polymer melt containing 15 micron EAA and 15 micron LLDPE were added from second coextruder head 306. Simultaneously, additional 70 micron three layer White PE film in a blend ratio of 2:1 from sandwich unwinder 404 was added to the laminating head 204. White PE film comprises of 6% (w/w) of TiO2. As soon as the semi laminated substrate, coextruded hot polymer melted and 70 micron White PE film passed through the laminating head NIP roll 612, a composite semi laminate of 182 micron was formed.

Example 2

Print Trials on the Laminate for Vignette and Tonal Image Printing

Print trials were carried out on laminate 1 having Aluminum foil as the barrier layer. The result was compared to a regular laminate that lacked the mirror finished outer surface layer.

Tables 3, and 4 describe the properties of the laminate that affect the quality of print on the laminate.

Table 3 depicts printing properties of comparable aluminum foil based multilayer regular laminate and aluminum foil based multilayer laminate with coated top layer finishing. Table 3 shows that he regular laminate has a higher gel count of 25 as compared to the surface coated laminate of the present invention which has a gel count of 9. Gel count is equivalent to the print defect count, that is the gel count directly affects the printing properties. As observed from Table 3, 106 spots were validated for testing the print quality. For the regular laminate, 25 out of 106 spots showed print defect, i.e. 23.6% of the impression validated were found defective. On the contrary for the top layer coated laminate of the present invention, only 9 out of 106 spots showed print defect, i.e., 8.5% were found to be defective. From he results, it can be inferred that the top layer coated laminate of the present invention shows a better printing quality than a comparable regular laminate.

TABLE 3

Print trial of comparable aluminum foil based multilayer laminate one with std. laminate and the other with $3^{rd}$. layer PE finishing coating

| Print job: OXY BLEACH | Unit of Measurement | Regular Aluminum foil based Laminate, 182 mic. thickness | $3^{rd}$. stn.PE Coated Aluminum foil based Laminate, 202 mic. thickness |
|---|---|---|---|
| Impression Validated | Nos | 106 | 106 |
| Print defect Count | Nos | 25 | 9 |
|  | % | 23.6% | 8.5% |
| Laminate Area Validated | SqM | 1.1 | 1.1 |
| Gel Count, causing print | Nos | 25 | 9 |
|  | Nos/SqM | 22.7 | 8.2 |

Advantages Gained in the Example Illustrative Process in this Subject Matter:

Although the subject matter has been described in considerable detail with reference to certain examples and implementations thereof, other implementations are possible. As such, the spirit and scope of the appended claims should not be limited to the description of the preferred examples and implementations contained therein.

The laminate as described herein provides a flaw less surface for good quality printing. The laminate surfaces as described in the present disclosure is very smooth, is homogeneous and free from any polymer Gels and surface indentations. The gel count of the laminate is low in the range of 1-10 nos./sqm which results in high quality printing of the surface.

I claim:

1. A laminate for vignette and tonal image printing comprising:
    a top printable layer comprising a polyethylene polymer selected from the group consisting of a metallocene linear low density polyethylene (mLLDPE), a linear low density polyethylene (LLDPE) with a high melt flow index (MFI), a low density polyethylene (LDPE), and combinations thereof;
    a middle layer comprising at least one surface film layer comprising a blend of linear low density polyethylene (LLDPE), and high density polyethylene (HDPE); and
    an inner polyethylene (PE) layer;
    wherein said top printable layer exhibits a gel count in a range of from 1 to 10 per sqm.

2. The laminate as claimed in claim 1, wherein the top printable layer comprising the polyethylene polymer comprises a blend of metallocene linear low density polyethylene (mLLDPE), and low density polyethylene (LDPE) with a blend ratio in a range of from 3:1 to 1:1.

3. The laminate as claimed in claim 1, wherein the top printable layer of polyethylene polymer comprises a blend of linear low density polyethylene (LLDPE) with high melt flow index (MFI), and low density polyethylene (LDPE) with a blend ratio in a range of from 3:1 to 1:1, wherein the melt flow index is in a range of from 6.0 to 20.0.

4. The laminate as claimed in claim 1, wherein the surface film layer is at least a three layer combination of a blend of linear low density polyethylene (LLDPE), and high density polyethylene (HDPE) with a blend ratio in a range of from 1:1 to 1:9.

5. The laminate as claimed in claim 1, wherein the surface film layer further comprises a colorant selected from the group consisting of titanium dioxide ($TiO_2$), zinc disulfide ($ZnS_2$), zinc oxide (ZnO), barium sulfate ($BaSO_4$) and Calcium Carbonate ($CaCO_3$).

6. The laminate as claimed in claim 1, wherein the middle layer comprises a barrier layer placed between a first co-extruded polymer layer and a second co-extruded polymer layer, wherein the first co-extruded polymer layer is in contact with the surface film layer and the second co-extruded polymer layer is in contact with the inner polyethylene layer.

7. The laminate as claimed in claim 6, wherein the barrier layer is selected from the group consisting of aluminum foil, ethyl vinyl alcohol (EVOH) film, and combinations thereof.

8. The laminate as claimed in claim 6, wherein the first co-extruded polymer layer comprises a primary layer of only linear low density polyethylene (LLDPE) and a secondary layer selected from the group consisting of an ethylene acrylic acid (EAA) layer and a layer of only linear low density polyethylene (LLDPE), wherein the primary layer is in contact with surface film layer and the secondary layer is in contact with the barrier layer.

9. The laminate as claimed in claims 6, wherein the second co-extruded polymer layer comprises a primary layer of only linear low density polyethylene (LLDPE) and a secondary layer selected from the group consisting of an ethylene acrylic acid (EAA) layer and a layer of only linear low density polyethylene (LLDPE), wherein the primary layer is in contact with the inner polyethylene (PE) layer and the secondary layer is in contact with the barrier layer.

10. The laminate as claimed in claim 1, wherein the inner polyethylene (PE) layer comprising of at least one layer of a blend of linear low density polyethylene (LLDPE), and high density polyethylene (HDPE) with a blend ratio in a range of from 1:1 to 1:9.

11. A laminate for vignette and tonal image printing comprising:
    a top printable single layer comprising a blend of metallocene linear low density polyethylene (mLLDPE), and low density polyethylene (LDPE) with a blend ratio in a range of from 2:1 to 1:1, wherein the top printable single layer has a thickness of 20 microns;
a middle layer comprising:
   a surface film layer, wherein the surface film layer comprises a three layer combination of a blend of linear low density polyethylene (LLDPE), and high density polyethylene (HDPE) with a blend ratio in a range of from 1:1 to 1:9, wherein the surface film layer has a thickness of 70 microns;
   a first co-extruded polymer layer comprising a primary layer of only linear low density polyethylene (LLDPE) with a thickness of 15 microns in contact with the surface film layer, and a secondary layer of ethylene acrylic acid (EAA) with a thickness of 15 microns in contact with a barrier layer of aluminum foil with thickness of 12 microns;
   a second co-extruded polymer layer comprising a secondary layer of ethylene acrylic acid (EAA) with a thickness of 15 microns in contact with the barrier layer, and a primary layer of only linear low density polyethylene (LLDPE) with a thickness of 15 microns in contact with inner polyethylene (PE) layer; and
an inner polyethylene (PE) layer, wherein the inner polyethylene (PE) layer is a three layer combination of linear low density polyethylene (LLDPE), and high density polyethylene (HDPE), wherein the inner polyethylene (PE) layer has a thickness of 40 microns,
wherein said top printable single layer exhibits a gel count in a range of from 1 to 10 per sqm.

12. A laminate for vignette and tonal image printing comprising:
a top printable single layer of a blend of metallocene linear low density polyethylene (mLLDPE), and low density polyethylene (LDPE) with a blend ratio in the range of from 2:1 to 1:1, wherein the printable layer has a thickness of 20 microns;
a middle layer comprising:
   a surface film layer, wherein the surface film comprises a three layer combination of a blend of linear low density polyethylene (LLDPE), and high density polyethylene (HDPE) with a blend ratio in the range of 1:1 to 1:9, wherein the surface film layer has a thickness of 70 microns;
   a first co-extruded polymer layer comprising a primary layer of only linear low density polyethylene (LLDPE) with a thickness of 12 microns in contact with surface film layer, and a secondary layer of only linear low density polyethylene (LLDPE) with a thickness of 12 microns in contact with a barrier layer of ethyl vinyl alcohol (EVOH) film with a thickness of 79 microns;
   a second co-extruded polymer layer comprising of a secondary layer of only linear low density polyethylene (LLDPE) with a thickness of 12 microns in contact with the barrier layer, and a primary layer of only linear low density polyethylene (LLDPE) with a thickness of 12 microns in contact with an inner polyethylene (PE) layer; and
an inner polyethylene (PE) layer, wherein the inner polyethylene (PE) layer comprises a three layer combination of linear low density polyethylene (LLDPE), and high density polyethylene (HDPE), wherein the inner polyethylene (PE) layer has a thickness of 40 microns,
wherein said top printable single layer exhibits a gel count in a range of from 1 to 10 per sqm.

13. A process of manufacturing the laminate as claimed in claim 1, said process comprising the steps of:
  a. obtaining an inner polyethylene (PE) layer;
  b. contacting the inner polyethylene (PE) layer with a first co-extruded polymer layer, a barrier layer, and a second co-extruded polymer layer to obtain a composite semi-laminate;
  c. contacting the composite semi-laminate with a surface film layer to obtain a semi-laminated substrate;
  d. contacting the semi-laminated substrate with a blend of metallocene linear low density polyethylene (mLLDPE), and low density polyethylene (LDPE) to obtain a surface coated laminate; and
  e. cooling and compressing the surface coated laminate to obtain the laminate for vignette and tonal image printing.

14. A tube container made of the laminate as claimed in claim 1.

15. A process of manufacturing a tube container from the laminate as claimed in claim 1.

16. A tube container made of the laminate as claimed in claim 11.

17. A process of manufacturing a tube container from the laminate as claimed in claim 11.

18. A tube container made of the laminate as claimed in claim 12.

19. A process of manufacturing a tube container from the laminate as claimed in claim 12.

* * * * *